United States Patent [19]

Mizukoshi et al.

[11] Patent Number: 4,901,404

[45] Date of Patent: Feb. 20, 1990

[54] FASTENING BAND AND FASTENING TOOL THEREFOR

[75] Inventors: Yasumasa Mizukoshi, Fujisawa; Minoru Ishijima, Maebashi, both of Japan

[73] Assignee: Nippon Seiko Kabushiki Kaisha, Tokyo, Japan

[21] Appl. No.: 178,361

[22] Filed: Apr. 6, 1988

[30] Foreign Application Priority Data

Apr. 16, 1987 [JP] Japan ................... 62-91863

[51] Int. Cl.⁴ .............................. F16L 33/00
[52] U.S. Cl. .................... 24/20 TT; 24/20 R
[58] Field of Search ............ 24/20 R, 20 EE, 20 TT, 24/20 CW, 20 W

[56] References Cited

U.S. PATENT DOCUMENTS

| | | | |
|---|---|---|---|
| 2,318,816 | 5/1943 | Tinnerman | 24/20 TT |
| 4,468,840 | 9/1984 | Sauer et al. | 24/20 R |
| 4,492,004 | 1/1985 | Oetiker | 24/20 R |
| 4,712,278 | 12/1987 | Oetiker | 24/20 TT |
| 4,802,261 | 2/1989 | Mizukoshi et al. | |

FOREIGN PATENT DOCUMENTS 106814 3/1939 Austria ................ 24/20 EE

*Primary Examiner*—James R. Brittain

*Attorney, Agent, or Firm*—Shapiro and Shapiro

[57] ABSTRACT

This specification discloses a fastening band surrounding a cylindrical fastening member mounted on a member to be fastened and having the opposite end portions thereof adapted to be superposed one upon the other when the fastening member is fastened to the member to be fastened. A rectangular hole and slot extending long in the lengthwise direction of the body of the band are formed in succession from the fore end in a first end portion which is the outer side when the opposite end portions are superposed one upon the other. The end edge of the rectangular hole which is adjacent to the fore end provides a first tool engaging portion. A first projection for tentative fastening and regular fastening is inwardly formed on the end edge of the slot which is adjacent to the fore end. A second tool engaging portion comprising a protuberance, a second projection for tentative fastening and a third projection for regular fastening are outwardly formed in succession from the fore end on a second end portion which is the inner side when the opposite end portions are superposed one upon the other. By applying a force in the tangential direction of the fastening band in its tentatively fastened state to the first tool engaging portion, the first projection is caused to ride over the third projection and thereafter is caused to engage the third projection to thereby bring about a regularly fastened state.

4 Claims, 4 Drawing Sheets

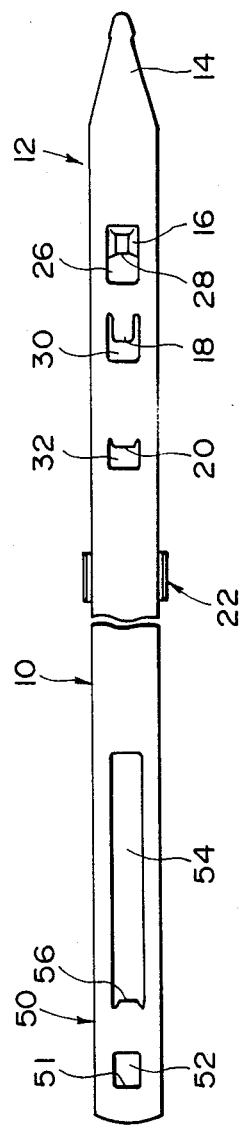
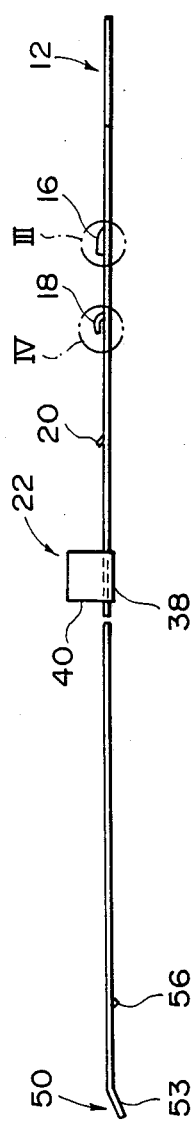
FIG. 1
FIG. 2

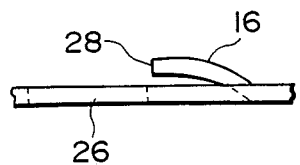
F I G. 3(a)   F I G. 3(b)
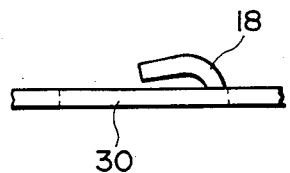
F I G. 4
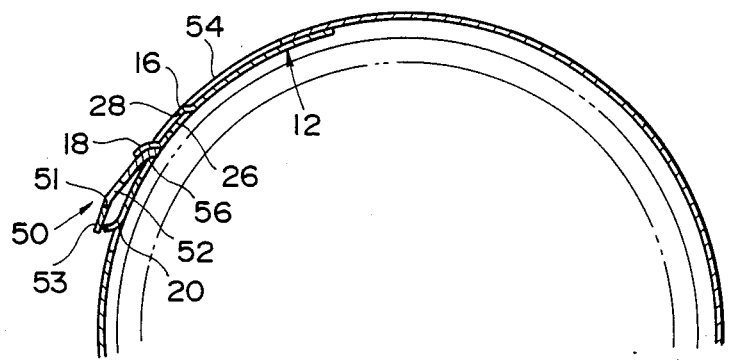
F I G. 5

FASTENING BAND AND FASTENING TOOL THEREFOR

BACKGROUND OF THE INVENTION

1. Field of the Invention

This invention relates to improvements in a fastening or clamping band used to fasten or clamp and fix a cylindrical member formed of a resilient material or the like to a fixture having a circumferential surface.

2. Related Background Art

A fastening or clamping band formed of band steel is used to fasten or clamp and fix a cylindrical boot, cover or the like to a fixture having a circumferential surface, such as the transmission shaft of a vehicle, for fastening the band, use is made of a fastening tool exclusively designed for such purpose. Prior art examples of the fastening band and fastening tool are shown, for example, in the applicants' Japanese Patent Application No. 76622/1985 (corresponding to U.S. Ser. No. 918,135, now U.S. Pat. No. 4,802,261).

The above-mentioned fastening band according to the prior art is initially made into the form of a loop for tentative fastening in which the opposite end portions thereof are superposed one upon the other, to thereby surround a boot or the like, whereafter the fastening band is deformed by a fastening tool so that the amount of overlap of the opposite end portions becomes greater (that is, the diameter of the loop becomes smaller), and a projection formed on a first end portion which is the outer side in a radial direction of the band and a projection formed on a second end portion which is the inner side in a radial direction of the band are engaged with each other to thereby bring about a regularly fastened state. However, the projection of the first end portion is formed radially inwardly and the projection of the second end portion is formed radially outwardly and therefore, the inward projection of the first end portion must ride over the outward projection of the second end portion when regular fastening is effected from the tentatively fastened state. At this time, it has sometimes happened that the two projections interfere with each other and are pushed down, and the projections can not successfully engage with each other so that the regular fastening becomes difficult or impossible.

Also, the above-mentioned fastening tool has comprised a pair of legs each having an engaging portion at the fore end thereof. The construction has been such that a a force is applied between the legs tending to bring them together or to urge them apart. Therefore, particularly when a fastening band of small diameter is fastened, the distance between the two engaging portions of the fastening tool relative to the diameter of a member to be fastened becomes greater and this has sometimes led to a result that the inner end portion is deformed outwardly. That is, when the fastening force applied to the second end portion is not in the tangential direction thereof but in the direction of chord, the second end portion expands radially outwardly.

Also, in the fastening tool shown in the applicants' Japanese Patent Application No. 5137/1986 (also corresponding to the aforementioned application U.S. Ser. No. 918,135), a discrete member is pivotally connected to the intermediate portion of a body having an engaging portion at the fore end thereof, and an engaging member is pivotally connected to the fore end of said discrete member. During fastening, the entire fastening tool is pivotally moved about the engaging portion of the body. However, since there are two movable portions, these portions are pivotally moved during fastening, and this has sometimes led to a result that the fastening operation cannot be accomplished quickly.

SUMMARY OF THE INVENTION

It is an object of the present invention to solve the above-noted problems peculiar to the prior art and to provide a fastening band contrived so that the engaging portions for regular fastening may not interfere with each other and may not be deformed thereby when regular fastening is effected from a tentatively fastened state.

It is also an object of the present invention to provide a fastening tool which can be suitably used for the fastening of fastening bands of various diameters and which will not come off the fastening band during the fastening operation and will be reliable in operation.

To achieve the above object, the present invention provides a fastening band adapted to surround a cylindrical fastening member mounted on a member to be fastened and having opposite end portions to be superposed one upon the other when the fastening member is fastened to the member to be fastened. A rectangular hole 52 and a slot 54 extending longitudinally in the lengthwise direction of the body of the band are formed in succession from the fore end in a first end portion 50 which is the outer side when the opposite end portions are superposed one upon the other, the end edge of said rectangular hole which is adjacent to the foe end provides a first tool engaging portion 51, and a first projection 56 for tentative fastening and regular fastening is inwardly formed on the end edge of said slot which is adjacent to the fore end. A second tool engaging portion 28 comprising a protuberance, a second projection 18 for tentative fastening and a third projection 20 for regular fastening are outwardly formed in succession from the fore end on a second end portion 12 which is the inner side when the opposite end portions are superposed one upon the other. To accomplish tentative fastening, the fastening band is made into the form of a loop with said first end portion superposed on the outer side of said second end portion and with said second projection and said second tool engaging portion fitted in said slot. Said first projection and said second projection are then engaged with each other. By applying a force in the tangential direction of the fastening band in its tentatively fastened state to said first tool engaging portion, said first projection is caused to ride over said third projection and thereafter is caused to engage said third projection to thereby bring about a regularly fastened state.

A preferred fastening tool according to the present invention includes at least an elongate body 80 having a fixed pawl 82 at the fore end thereof, a moving member 84 having a movable pawl 86 at the fore end thereof and slidable in said body in the lengthwise direction thereof, a lever 94 pivotally connected to said body at the fore end thereof, and a connecting member 100 interposed between the intermediate portion of said lever and said moving member and pivotally connected to the intermediate portion of said lever and said moving member at the respective end portions thereof. The fastening tool is used to regularly fasten a fastening band, such as that above-described, in accordance with the invention. During regular fastening of a band as described above, said fixed pawl 82 is engaged with said second tool engaging portion 28 and said movable pawl 86 is engaged with said first tool engaging portion 51, and by pivotally moving said lever toward said body, said first end portion 50 is moved in the tangential direction of the fastening band to cause said first projection 56 to ride over said third projection 20 and thereafter engage said third projection, thereby bringing about a regularly fastened state.

BRIEF DESCRIPTION OF THE DRAWINGS

FIG. 1 is a plan view showing an embodiment of the fastening band according to the present invention (in which some portions are omitted).

FIG. 2 is a front view of the fastening band shown in FIG. 1.

FIGS. 3(a) and 4 are enlarged views of portions III and IV, respectively, in FIG. 2, and FIG. 3(b) is a side view of the portion shown in FIG. 3(a).

FIG. 5 is a cross-sectional view showing the tentatively fastened state of the fastening band (in which the lower half is omitted).

DESCRIPTION OF THE PREFERRED EMBODIMENT

Figure 6:
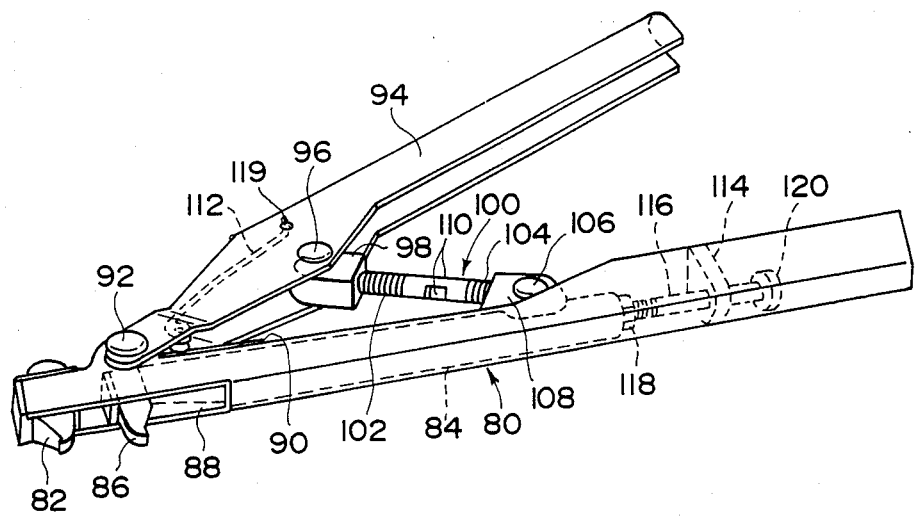
FIG. 6 is a perspective view showing an embodiment of the fastening tool according to the present invention.

An embodiment of the present invention will hereinafter be described with reference to the drawings.

As shown in FIGS. 1 to 4, the body 10 of a fastening band comprises band steel of a predetermined width, and an end portion 12 thereof which is the inner side when the body is made into the form of a loop with the end portions thereof superposed one upon the other has its tip region formed as a triangular portion 14. A protuberance 16 protuberant on the upper surface (front surface) side and upward projections 18 and 20 the upper surface side are formed in succession from the tip region, and a U-shaped retaining member 22 is secured to the body.

The protuberance 16, as shown in FIG. 3, is formed so as to be protuberant by a predetermined height over a predetermined length in the axial direction of the body 10. A rectangular hole 26 is formed in the body closely adjacent to the protuberance 16, and an end portion 28 of the protuberance 16 provides a tool engaging portion. The projection 18 is formed by forming a U-shaped cut-out in the body 10, and then bending up the portion surrounded by this out-out, as shown in FIG. 4, projection 18, and is curved in the lengthwise direction of the body 10, and the height of the possible consistent with the broader principles thereof. For example, free end side thereof. As a result of the projection 18 being bent up, a hole 30 is formed adjacent thereto. The projection 20 is formed in the same manner as the projection 18. However, it is not curved but is projected straight in an oblique direction, and a hole 32 is formed near the projection 20. The projection 18 is for tentative fastening, and the projection 20 is for regular fastening.

The retaining preventing member 22 comprises a base 38 of the same width as the body 10 and a pair of side portions 40. It is welded or otherwise secured to the body 10 at the base 38, with the side portions 40 being upright in the direction of plate thickness of the body 10 at either side thereof.

In an end portion 50 of the body, which is the inner side when the body is made into the form of a loop with the end portions thereof superposed one upon the other, there are formed in succession from the tip a rectangular hole 52 and a slot 54 of a predetermined width extending longitudinally in the lengthwise direction of the body 10. The rectagular hole 52 is formed near the tip of the end portion 50, and one end edge 51 thereof provides a tool engaging portion. At one end edge of the slot 54, i.e., that end edge which is adjacent to the rectangular hole 52, there is formed a projection 56 protruding in an oblique direction on the lower surface of the body 10. This projection 56 is for tentative fastening and regular fastening.

In FIG. 5, this fastening band is made into the form of a loop by curving it manually with the surface opposite to the surface on which the projections 18 and 20 are formed inside. The end portion 50 is superposed on the outer side of the end portion 12, and the protuberance 16 and the projection 18 are fitted into the slot 54. When in this state, the superposed portion is pulled in a direction to increase the diameter of the band, the projection 56 comes into the root portion of the projection 18 to restrain the latter while forcing up (resiliently deforming) the projection 18 whose free end side is low. At this time, the projections 56 and 18 are reliably restrained by the resilient deformation of the projection 18. Moreover, because the protuberance 16 and the projection 18 are fitted in the slot 54, the end portions 12 and 50 do not deviate from each other in the widthwise direction. Accordingly, there is provided a tentatively fastened state which will not be easily destroyed during handling. Also, as shown in FIGS. 2 and 5, the tip region of the end portion 50 is somewhat inwardly bent. This bend portion 53 is in contact with the projection 20 and therefore, the outer end portion 50 (particularly the tool engaging portion 51) is raised up from the inner end portion 12.

In its tentatively fastened state, the fastening band is installed on the outer periphery of a boot or the like, whereafter regular fastening is effected by means of a fastening tool. The fastening tool will now be described with reference to FIG. 6.

A body 80 has a U-shaped cross-section in which the upper surface side opens, and has a fixed pawl 82 fixed to the fore end thereof. A square bar 84 which provides a moving member is slidably fitted in the intermediate portion of the body 80. A movable pawl 86 is fixed to the fore end of the square bar 84, and this movable pawl 86 protrudes from a cut-away 88 formed in the lower surface of the fore end portion of the body 80. A guide plate 90 for the square bar 84 is fixed to the upper surface of the fore end portion of the body 80, and the fore end of a lever 94 is pivotally connected to said upper surface by a pivot shaft 92.

The lever 94 has a U-shaped cross-section in which the lower surface side opens, and has a connecting member 98 pivotally connected to the intermediate portion thereof by a pivot shaft 96, and the threaded portion 102 of one end of a connecting pin 100 is threadably engaged with the connecting member 98. The threaded portion 104 of the other end of the connecting pin 100 is threadably engaged with a connecting member 108 pivotally connected to the distal end of the square bar 84 by a pivot shaft 106. The threaded portions 102 and 104 are formed in opposite directions. A pair of planar portions 110 are formed at opposed positions on the intermediate portion of the connecting pin 100. An L-shaped spring 112 is mounted on the fore end portion of the lever 94, and one leg of the L-shaped spring is restrained in a small hole formed in said body 80 and the other leg is restrained in a small hole 119 formed in the lever 94, and the L-shaped spring biases the lever 94 counter-clockwise (as viewed in FIG. 6).

A stop 114 is fixed to the rear portion of the square bar 84, and an adjusting bolt 116 threadably engaged with the rear end of the square bar 84 extends through the stop 114. A lock nut 118 threadably engaged with the adjusting bolt 116 bears against the rear end surface of the square bar 84, and by loosening the lock nut 118 and rotating the adjusting bolt 116, the amount of protrusion of the adjusting bolt 116 from the square bar 84 can be adjusted. A stop 120 is fixed to the rear end of the adjusting bolt 116 and is capable of bearing against the stop 114.

During regular fastening, the fixed pawl 82 of the fastening tool is engaged with the protuberance 16 of the fastening band and the movable pawl 86 is engaged with the tool engaging portion 51, and a depressing force is applied to the distal end portion of the lever 94. Because the inner part of the protuberance 16 is opened to the slot 54 and hole 26 and because the tool engaging portion 51 is raised up due to the action of the bent portion 53, the engagement of the tool is easy. With the pivotal movement of the lever 94, the square bar 84 slides in the body 80 through the connecting pin 100 and the movable pawl 86 moves away from the fixed pawl 82.

Figure 7:
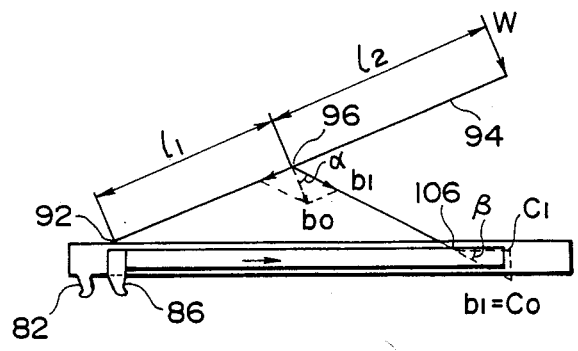
FIGS. 7 and 8 illustrate the operation thereof.

If, as shown in FIG. 7, the operating force applied to the lever 94 is W, and the distance from the pivot shaft 92 of the lever 94 to the pivot shaft 96 is $l_1$, and the distance from the pivot shaft 96 to the point at which the operating force W is applied is $l_2$, the force $b_0$ acting on the pivot shaft 96 in a direction perpendicular to the lengthwise direction of the lever 94 is $$b_0 = (l_1 + l_2) \times W/l_1$$

from $(l_1 + l_2) \times W = l_1 \times b_0$. If the angle formed between the perpendicular to the lever 94 at the pivot shaft 96 and the connecting pin 100 is $\alpha$, the force acting on the connecting pin is $$b_1 = b_0/\cos \alpha.$$

Ignoring frictional resistance to make the present invention more readily understood, the force $c_1$ applied to the movable pawl 86 is $$c_1 = b_1 \times \cos\beta = \frac{(l_1 + l_2) \times \cos\beta \times W}{l_1 \times \cos\alpha}$$

where $\beta$ is the angle formed between the lengthwise direction of the connecting pin 100 an the body 80.

Figure 8:
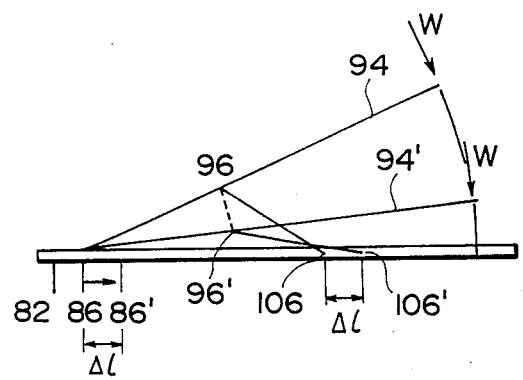

When, as shown in FIG. 8, the lever 94 is pivotally moved to a position indicated by 94', the pivot shafts 96 and 106 are moved to positions indicated by 96' and 106'; respectively, and as a result, the movable pawl 86 is moved by a stroke $\Delta l$ to a position indicated by 86'.

As the lever 94 is gripped, the angle $\alpha$ becomes approximate to 90° (accordingly, $\cos \alpha$ becomes approximate to zero), and the angle $\beta$ becomes approximate to 0° (accordingly, $\cos \beta$ becomes approximate to 1), and the force $c_1$ produced in the movable pawl 86 becomes greater. Thus, a great fastening force $c_1$ as compared with the operating force W applied to the lever 94 is obtained, and the end portion 50 is pulled by the fastening force $c_1$ so that the amount of overlap thereof with the end portion 12 becomes greater (that is, leftwardly obliquely downwardly as viewed in FIG. 5).

The fastening force $c_1$ is applied in the tangential direction of the fastening band made into the form of a loop. This is assured by adjusting the connecting pin 100 and the lock nut 118, and thus the relation of the spacing between the fixed pawl 82 and the movable pawl 86 and the magnitude of the diameter of the fastening band in its tentatively fastened state (the adjustment of the connecting pin 100 and the lock nut 118 will be described later). Accordingly, even when the projection 56 rides over the projection 20, the projection 20 is not pushed down by the projection 56. Also, since the projection 16 is guided by the slot 54, the end portions 12 and 50 do not deviate from each other in the widthwise direction.

Figure 9:
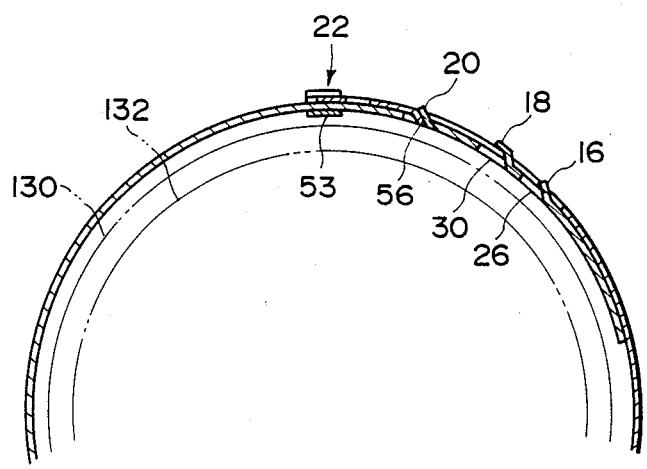
FIG. 9 is a cross-sectional view showing the regularly fastened state of the fastening band (in which the lower half is omitted).

When the body 80 of the fastening tool is inclined downwardly when the projection 56 has been moved to a point past the projection 20 by pivotal movement of the lever 94, the inner end portion 12 moves so that the amount of overlap thereof with the outer end portion 50 becomes greater, and the projection 56 is restrained by the projection 20. When the lever 94 is loosened with the tool in this state, the square bar 84 is moved by the action of the spring 112 and the movable pawl 86 returns to its initial position, whereby it becomes possible to remove the tool from the band. In this state of the band, the fore end of the outer end portion 50 is positioned between the opposite sides 40 of the retaining member 22 and therefore, by inwardly bending the sides 40, the outer end portion 50 is prevented from drifting outward. Thus, as shown in FIG. 9, a boot 130 is fastened and mounted around a transmission shaft 132 by the fastening band.

To apply a tangential force to the outer end portion 50 during the regular fastening of the fastening band, the spacing initial between the fixed pawl 82 and the movable pawl 86 (that is, the spacing when the lever 94 is in a free or open state) is important. When the size of the fastening band varies and it is desired to adjust the position of the movable pawl 86, the lock nut 118 may be rotated in a direction to loosen it and the amount of protrusion of the adjusting bolt 116 may be adjusted. That is, since the position of the movable pawl 86 in the open state of the lever 94 is determined by the stop 120 bearing against the stop 114, the adjusting bolt 116 may be rotated to thereby adjust the amount of protrusion thereof, whereby the position of the movable pawl 86 in the open state (the natural state) of the lever 94 is determined.

Also, the angle formed by the lever 94 in its open state with respect to the body 80, namely the spacing between the distal end of the body 80 and the distal end of the lever 94, is adjusted by rotating the connecting pin 100. Rotation of the connecting pin 100 is effected with a tool exclusively for use for this purpose engaged with the flat portion 110. When the connecting pin 100 is rotated, the spacing between the connecting members 98 and 108 is varied because the threaded portions 102 and 104 at the opposite ends are formed in opposite directions, and the angle of opening of the lever 94 can be adjusted, whereby the movement stroke of the movable pawl 86 is determined.

The present invention is not restricted to the above-described embodiment, and various changes are possible consistent with the broader principles thereof. For example, the shapes, sizes and positions of the projections 16, 18, 56 and slot 54 of the fastening band and the fixed pawl 82, movable pawl 86, connecting pin 100 and the adjusting bolt 116 of the fastening tool can be varied. Also, the movable pawl may be engaged with the second tool engaging portion of the second end portion, and the fixed pawl may be engaged with the first tool engaging portion of the first end portion.

As described hitherto, according to the fastening band of the present invention, during regular fastening, the projection 56 of the outer end portion 50 will smoothly ride over the projection 20 of the inner end portion 12 and therefore, the projection 56 and/or the projection 20 is not pushed down, but is reliably restrained. This holds true irrespective of the magnitude of the diameter of the fastening band, and fastening bands of various sizes can be regularly fastened with high reliability.

Also, preferably, the amounts of protrusion of the projections 16, 18, 20 and 56 are minimized and the retaining member 22 is of a plate thickness equal to or less than the plate thickness of the body 10. Therefore, the thickness of the fastening band after the completion of regular fastening is three times the plate thickness of the body 10 or less. Furthermore, the amount of protrusion of each projection from the body 10 is slight and therefore, the swing circle is small and there is no danger that the surrounding components will be interfered with by the projections during the rotation of the transmission shaft. The projections 20, etc. are integral with the body 10 and are of sufficient strength and therefore will never be damaged after regular fastening.

As will further be appreciated, the fastening tool has no freely movable portion and is therefore reliable in operation, and the fixed pawl 82 and movable pawl 86 will never come off the fastening band inadvertently. Also, the fastening tool is provided with a toggle mechanism and therefore, a great fastening force $c_1$ can be obtained for a small operating force W. Moreover, the fastening tool has such advantages and yet is compact and light in weight as a whole.

We claim:

1. A fastening band adapted to be formed into a looplike shape around a cylindrical member with a first end portion of the band overlapping a second end portion of the band to the outside of the second end portion, characterized in that:

said first end portion has, in succession from a tip end thereof, a rectangular hole and an elongate slot extending longitudinally in a lengthwise direction of the band, with an inwardly directed first projection being formed at an end edge of said slot nearer to said tip end and with an end edge of said rectangular hole nearer to said tip end constituting a first tool-engaging portion, said second end portion has, in succession from a tip end thereof, an outward protuberance with an end edge constituting a second tool-engaging portion, an outwardly directed second projection for tentative fastening, and an outwardly directed third projection for final fastening, and said rectangular hole, said slot, said protuberance, and said first, second and third projections are configured and disposed such that said first and second end portions may be partially overlapped into a tentatively fastened state in which said protuberance and said second projection are received by said slot with said second projection engaging said first projection, and such that with said fastening band in said tentatively fastened state, said first and second tool-engaging portions may be engaged by a fastening tool, and said first tool-engaging portion thereby subjected to a tangential fastening force tending to move said first tool-engaging portion relatively away from said second tool-engaging portion to cause said first projection to ride over said third projection thereby to bring the fastening band into a finally fastened state in which said protuberance and said second and third projections ar received by said slot with said first projection engaging said third projection.

2. A fastening band according to claim 1, further comprising retaining means secured to said second end portion for preventing said first end portion from drifting outward from said second end portion when the fastening band is in said finally fastened state.

3. A fastening band according to claim 1, wherein a part of said first end portion nearer than said rectangular hole to said tip end of said first end portion is inwardly bent and disposed to contact said third projection in said tentatively fastened state, such that said first tool-engaging portion is somewhat raised up from said second end portion of the fastening band when the fastening band is in said tentatively fastened state.

4. A fastening band according to claim 1, wherein said second projection has a free end portion that is curved inwardly toward a main body of the fastening band, such that the second projection is resiliently upwardly deformable by said first projection as the fastening band is brought into said tentatively fastened state, thus providing resilient restraint of said first and second projections with the fastening band in said tentatively fastened state.

* * * * *